Dec. 2, 1969        K. A. DARROW        3,481,825
DIRECT BONDING OF DIAMOND TO MOLYBDENUM
Original Filed July 26, 1965
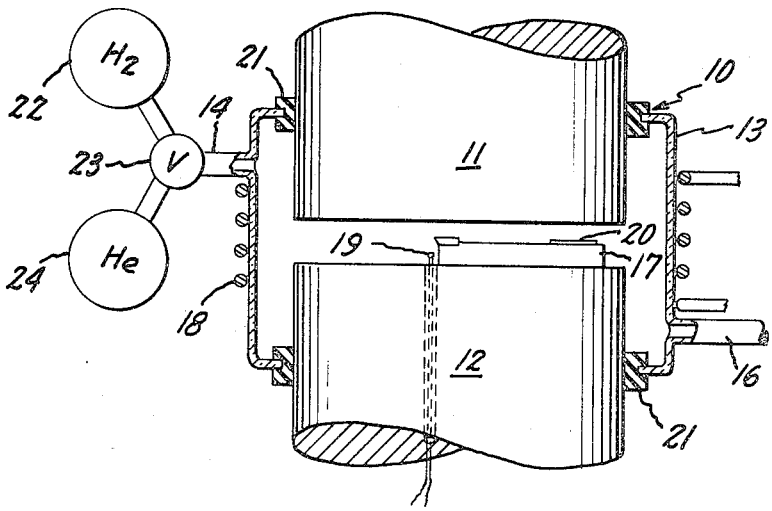
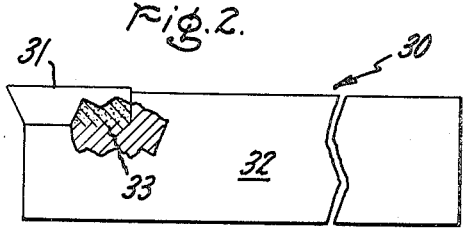
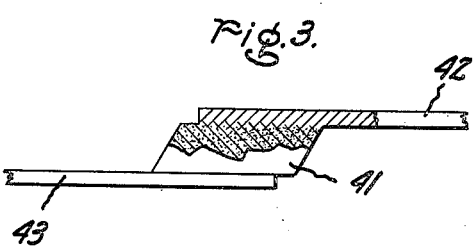
Inventor:
Kenneth A. Darrow,
by Leo J. Malossi
His Attorney.

United States Patent Office 3,481,825
Patented Dec. 2, 1969

3,481,825
DIRECT BONDING OF DIAMOND TO MOLYBDENUM
Kenneth A. Darrow, Sprakers, N.Y., assignor to General Electric Company, a corporation of New York
Original application July 26, 1965, Ser. No. 474,765, now Patent No. 3,377,696, dated Apr. 16, 1968. Divided and this application Jan. 19, 1968, Ser. No. 699,263
Int. Cl. B32b 15/04, 7/04, 31/06
U.S. Cl. 161—188        7 Claims

ABSTRACT OF THE DISCLOSURE

The direct bonding of diamond to molybdenum metal without using a brazing or soldering medium is described as well as products producible by the use of such bonding technique. The interface bond between the diamond and molybdenum consists solely of molybdenum carbide(s).

---

This is a division of application Ser. No. 474,765, filed July 26, 1965 (now U.S. Patent 3,377,696) and relates to the securing of a diamond crystal to a metal surface without the necessity of introducing a brazing or soldering medium. More particularly, this invention is directed to a novel method for bonding molybdenum metal directly to a diamond crystal and to useful constructions resulting from such a union.

Diamond has uses in a variety of applications, wherein a diamond crystal must be secured to metal to enable the effective usage of the diamond. By way of example, diamond crystals may be used in cutting tools, as tips for phonograph pick-up devices, and as semiconductor crystalline material for use in electronic components.

Although methods have been proposed for connecting diamond crystals to metal members, the methods for achieving a durable physico-chemical bond are relatively complex and expensive and in all instances involve the use of at least two metals and thereby require at least two interfaces between the diamond material and the metal stock. In addition to the formation of a chemical or quasi-chemical junction between diamond and metal, less permanent methods have been employed. Thus, one method that has been used in the preparation of diamond grinding tools for example, is that wherein the diamond crystals are simply embedded in a matrix of metal and support for the diamond is received solely by being surrounded by a mass of metal. When the encasing metal wears away during use, however, the diamond crystals are usually dislodged and lost long before the potential abrasive value of the diamond is realized. For this reason much more permanent arrangements have been sought for holding and utilizing more fully the diamond abrasive material.

It is therefore a prime object of this invention to provide a simplified mechanism for fastening diamond crystals to metallic members.

It is another object of this invention to provide a method employing elevated temperatures for very short periods of time whereby metal members may be bonded directly to a diamond crystal without the necessity of employing brazing materials.

It is a further object of this invention to provide a diamond-presenting implement comprising molybdenum metal stock having diamond material affixed thereto with the bond between the diamond material and the molybdenum consisting solely of molybdenum carbide.

It is still another object of this invention to provide a diamond cutting tool comprising a molybdenum shank having diamond material strongly affixed directly thereto.

It is still a further object of this invention to provide an electronic construction comprising a semiconducting diamond with conducting leads in electrical contact therewith, the leads being of molybdenum metal affixed directly to the semiconducting diamond.

The above-mentioned objects are attained by the practice of this invention which, briefly described, consists of the following method and the useful products that may be produced thereby. In general, first the diamond material to be mounted is sawed to the desired size and shape and a mounting surface is prepared thereon by grinding to remove saw marks from the diamond surface thereby providing a surface that may be easily matched. Next, a mounting surface is formed on the molybdenum metal, as for example, by grinding so as to closely match the ground surface of the diamond over at least 50 percent of the area of the common juncture to be effected therebetween, and preferably over at least 90 percent of this juncture. The ground and matched surfaces of molybdenum metal and diamond are placed into contact with each other in an appropriate apparatus able to apply a pressure great enough to insure very close physical contact therebetween. When this pressure, which may in some instances be as high as 2000 p.s.i., has been applied, these materials so oriented are thoroughly cleaned by flushing the surfaces thereof with hydrogen gas for a period of at least about 10 seconds at a temperature ranging from about 300° to about 600° C. Next, still retaining the close physical contact between the diamond and the molybdenum metal, the combination is quickly heated in an inert atmosphere so that the temperature of the contacting surfaces thereof reaches a value in the range of from about 1100° to about 1200° C. for a period that may range up to about 10 seconds, but preferably is in the range from about 2 to about 5 seconds. The combination is then allowed to quickly cool and is removed from the apparatus with the diamond strongly adhered to the molybdenum metal by the formation of a carbide layer.

The exact nature of this invention will be readily apparent from consideration of the following specification relating to the annexed drawing in which:

FIG. 1 is a schematic representation of an apparatus in which the method of this invention may be practiced;

FIG. 2 is an elevational view, partly in section, showing the combination of a molybdenum tool shank with a diamond cutting tip firmly affixed thereto; and FIG. 3 is an elevational view of a semiconducting diamond to which leads of molybdenum metal have been affixed in accordance with this invention.

The essential components for the practice of this invention are shown in FIG. 1. Therein the pressure apparatus 10 comprises a pair of opposed pressure exerting elements 11 and 12, which may consist of a piston and an anvil, for example. Forming an enclosure about the pressure exerting members 11, 12 is an envelope 13 having entrance and exit means 14, 16, respectively, for selectively flushing gases over the workpiece 17 and through the system. Surrounding the envelope 13 is induction heating coil 18, which is capable of very quickly raising the temperature within the enclosure 13 such that the contacting diamond and molybdenum surfaces may be controllably heated for a short period of time to a temperature within the range of from about 1100° to about 1200° C. Thermocouple 19, which is shown arranged as closely as is convenient to the workpiece 17, is employed to provide an accurate indication of the temperature of the diamond-molybdenum interface.

The accuracy of the temperature indicated by thermocouple 19 is assured by calibrating apparatus 10 with a second thermocouple (not shown) whereby a given indication of voltage output by thermocouple 17 will be indicative of some given temperature at the location of the diamond-metal interface. Accurate temperature control is very important to the practice of this invention, since at temperatures in excess of 800° C. diamond oxidizes at a detectable rate with the diamond converting to the graphite form of carbon. However, if the temperature of the diamond is elevated quickly for a period of short duration, it has been found that the graphitization is minimal and, in the case of molybdenum, a thin carbide layer is formed between the diamond surface and the molybdenum metal surface, which very strongly bonds these two materials together. Tests wherein diamond crystals have been adhered by the practice of this invention to well-matched surface on a molybdenum rod have established that values as high as 52,000 p.s.i. in torsion can be realized for the bond between the diamond and the molybdenum.

Although at least 28 elements are known to produce a carbide, at least 23 of these elements can be eliminated from practical consideration in the practice of this invention, because they are either too expensive, too difficult to form or too active chemically. Of the remaining five (iron, molybdenum, tantalum, titanium, and tungsten) molybdenum is the only metal found capable of entering into and remaining in direct union with diamond in the manner described herein. Thus, although it is known and has been described (application Ser. No. 370,872, Vanderslice filed May 28, 1964 [now U.S. Patent 3,351,-543] and assigned to the assignee of this invention) that a number of metals including molybdenum can be firmly adhered to diamond by the use of a special sputtering technique during which metal in particulate form is brought into contact with the diamond surface, the instant invention does not require the sputtering apparatus, or sputtering operation and the molybdenum need not be in the finely divided state. Actually, insofar as can be determined, molybdenum appears to be unique in its capacity to unite in its solid form with diamond with but relatively simple preparation. In the practice of this invention the solid molybdenum is able to form carbide(s) at the matched interface with the diamond material at a temperature far below the melting point of the molybdenum. Analysis of the material comprising the interface between the molybdenum and the diamond has identified the presence of both $Mo_2C$ and $MoC$.

Although the exact reason is not known as to why solid molybdenum can be directly bonded to diamond, while the other materials tested would not adhere to the diamond, it is believed that two factors may contribute to the uniqueness of molybdenum. These factors are, first, that the carbide formation at the matched interface between the diamond is an unsaturated form ($Mo_2C$ and $MoC$, rather than $MoC_2$) and the second factor is that the atomic spacing of molybdenum almost matches that of diamond.

Although the atomic spacing for tantalum is also very close to that of diamond, tantalum apparently does not form intermediate carbides. Previous experience with tungsten films sputtered on diamond indicate the unlikelihood of tungsten as a metal for use in the practice of this invention. Tungsten not only has a very high melting temperature, but also, although adherent tungsten films will form on diamond crystals in the aforementioned sputtering process, these films quickly lose their adherence when heated, apparently because the desirable intermediate tungsten carbides were converted to the high carbon content carbide form. In the case of iron, tantalum and titanium the method of this invention was practiced and ranges of temperature exposure were even expanded to insure the formation of carbide at the matched interface. However, in each instance, although a carbide did form at the diamond-metal interface and the diamond was etched, no bonding of metal to diamond occurred.

It appears that iron, titanium and tungsten have an atomic spacing, which is temperature-dependent, whereby these metals exist in different forms at different temperatures. Further, the atomic spacing of these metals, when in some of these forms, is substantially different from the atomic spacing of carbon in the diamond lattice. Iron, for example, exists in the alpha, gamma and delta forms; titanium occurs in the alpha and beta forms; and tungsten, in the alpha and beta forms.

In the practice of this invention in the apparatus 10 shown in FIG. 1, for example, after matched diamond and molybdenum contact surfaces have been prepared by appropriate forming and grinding, the workpiece 17 is introduced between pistons 11 and 12 in apparatus 10. If required, shims 20 may be used to insure axial application of force to the workpiece 17. A force sufficient to insure close physical contact between the matching surfaces of diamond and molybdenum metal is applied with pistons 11, 12. Seals 21 are designed to permit adjustment of pistons 11 and 12 relative to each other.

Although in most cases a relatively low pressure will suffice, pressures up to about 2000 p.s.i. may be used. Next, hydrogen gas from source 22 is flushed through envelope 13 by properly orienting valve 23 with the gas preferably entering and then leaving the envelope at opposite ends thereof. Heating coil 18 is actuated in order to raise the temperature within envelope 13 to within the range of from about 300° to about 600° C. This flushing with hydrogen at elevated temperature will penetrate to and over the contact surfaces to remove water vapor and minor accumulations of oil films. After thoroughly flushing with hydrogen gas for at least about 10 seconds and while still retaining the requisite pressure application for insuring close physical contact between the elements to be joined, valve 23, is repositioned to admit an atmosphere of inert gas into the interior of envelope 13 from source 24. Preferably, helium is the inert gas employed in order to assure good conduction of heat away from the workpiece. The current input to heating coil 18 is increased to quickly raise the temperature within the envelope 13 so that the temperature of the matching surface of the diamond and the prepared portion of the tool shank are brought within the temperature ringe of from about 1100° to about 1200° C. Using a relatively small piece of apparatus, it may take as little as about 10 seconds or less to secure the appropriate temperature and this temperature preferably is maintained for a period of time ranging from about 2 to about 5 seconds. Apparently during this rapid heating such oxygen as may have been adsorbed on the contact surfaces is driven off as CO or $CO_2$. Thereafter energy input into the heating coil 18 is promptly cut off and the system is allowed to cool. Using helium as the inert atmosphere promotes cooling of the interior of envelope 13 at such a rate that in about 10 seconds the temperature of the system will have dropped to a point permitting the removal of workpiece 17 from the apparatus.

An example of a tool produced by this method is shown in FIG. 2. Therein is shown the cutting tool 30 prepared by joining the diamond cutting tip 31 to the molybdenum shank 32, with the interface 33 responsible for the very effective bonding consisting of non-stoichiometric carbides of molybdenum. Such diamond-tipped tools 30 are particularly advantageous for shaping carbide. If desired, tool 30 may be reshaped with a diamond lap, in order, for example, to adapt the tool to specific uses. This same general operation may, of course, be employed to produce diamond-pointed scribers, glass cutters, phonograph pick-up styli or the like.

Another important application of this invention lies in the attachment of electrical leads to semiconducting diamonds in the manner illustrated in FIG. 3. Although the construction shown in FIG. 3 shows a semiconducting diamond 41 having a pair of molybdenum leads 42 and 43 affixed thereto by the method of this invention, different arrangements having fewer or more than two leads may be employed depending upon the application.

Although in most instances the surface contour most easily productive of good matching between diamond and molybdenum metal would be flat, this invention is not limited to the use of flat matching surfaces. For example, a portion of the underside of piston 11 may be formed in some shape other than as a flat surface, or having an insert therein so formed, which shape matches a given diamond surface. Thereafter, molybdenum foil may be inserted between the matching faces of the diamond and the underside of piston 11 and by the exertion of pressure the foil may be molded against the diamond to insure the requisite close physical contact. Thereafter, conduct of the balance of the method of this invention will insure good bonding between the foil and the diamond.

Thus, by the practice of this invention it now becomes possible to directly bond a solid piece of molybdenum metal (as contrasted to the sputtered films of U.S. 3,351,543 Vanderslice) to diamond to thereby provide for the simplified production of a variety of diamond-tipped tools as well as the establishment of reliable electrical connections to semiconducting diamonds, which connections hitherto have been difficult to attain.

Although many processes are described in the art for affixing a diamond to a metal surface, in each instance the actual joining of the diamond to the metal surface has required the use of an auxiliary metal or alloy to form an intermediate braze. As an indication, molybdenum-coated diamonds produced by the sputtering process (described in U.S. 3,351,543 Vanderslice) are described as able to be bonded to each other by the use of copper as a brazing material.

It is to be understood that minor deviations from the process parameters and structural arrangements described herein as would be obvious to those skilled in the art may be resorted to without departing from the spirit and scope of the invention as hereinafter defined by the appended claims.

What I claim as new and desire to secure by Letters Patent of the United States is:

1. A diamond-presenting implement comprising a solid piece of molybdenum metal having a portion of the surface thereof directly bonded to a portion of the surface of a diamond with bonds consisting solely of molybdenum and carbon atoms.

2. The implement substantially as recited in claim 1 wherein the diamond is semiconducting.

3. The implement substantially as recited in claim 1 wherein the interface between the diamond and molybdenum consists of a mixture of molybdenum carbides.

4. The implement substantially as recited in claim 1 wherein the interface between the diamond and molybdenum consists of non-stoichiometric molybdenum carbides.

5. A semiconducting element comprising a semiconducting diamond and at least one solid longitudinally-extending molybdenum metal member affixed to and in direct contact with said diamond at one end of said member and free of said diamond at the opposite end thereof.

6. The semiconducting element of claim 5 wherein the interface between the diamond and the molybdenum metal member consists of a mixture of molybdenum carbides.

7. The semiconducting element of claim 5 wherein the interface between the diamond and the molybdenum metal member consists of non-stoichiometric molybdenum carbides.

References Cited

UNITED STATES PATENTS 3,351,543    11/1967    Vanderslice _____ 51—309 X

FOREIGN PATENTS 274,317    10/1964    Australia.

E. A. GOLDBERG, Primary Examiner

U.S. Cl. X.R.

76—101; 161—213; 338—322, 334